United States Patent [19]

Reid et al.

[11] Patent Number: 4,469,606
[45] Date of Patent: Sep. 4, 1984

[54] STABILIZATION SYSTEMS FOR FIBER FINISHES

[75] Inventors: William J. Reid, New Fairfield; Gerald A. Capocci, Greenwich, both of Conn.

[73] Assignee: Ciba-Geigy Corporation, Ardsley, N.Y.

[21] Appl. No.: 401,475

[22] Filed: Jul. 26, 1982

[51] Int. Cl.$^3$ .............................................. D06M 13/18
[52] U.S. Cl. ...................................... 252/8.8; 252/8.9; 252/47.5
[58] Field of Search .......................... 252/8.8, 8.9, 47.5

[56] References Cited

U.S. PATENT DOCUMENTS

| | | | |
|---|---|---|---|
| 2,674,619 | 4/1954 | Lundsted | 252/174.21 |
| 3,101,374 | 8/1963 | Patton | 544/398 |
| 3,146,272 | 8/1964 | Lloyd | 252/52 R |
| 3,255,191 | 6/1966 | Dexter et al. | 252/47 |
| 3,285,855 | 11/1966 | Dexter et al. | 252/57 |
| 3,334,046 | 8/1967 | Dexter et al. | 252/47.5 |
| 3,340,309 | 9/1967 | Weipert | 252/DIG. 6 |
| 3,397,081 | 8/1968 | Mayberry | 252/8.6 |
| 3,441,575 | 4/1969 | Dexter et al. | 560/3 |
| 3,504,041 | 3/1970 | Weipert | 252/174.21 |
| 3,505,220 | 4/1970 | Blake et al. | 252/8.6 |
| 4,110,227 | 8/1978 | Newkirk et al. | 252/8.6 |
| 4,127,490 | 11/1978 | Newkirk et al. | 252/8.6 |
| 4,217,228 | 8/1980 | Koerner et al. | 252/8.6 |

*Primary Examiner*—Maria Parrish Tungol
*Attorney, Agent, or Firm*—Harry Falber

[57] ABSTRACT

Fiber finish compositions comprising a major amount of a polyoxyalkylene glycol or fatty acid ester lubricant and a minor amount of an oxidative and thermal stabilizer system therefor comprising a blend of a substituted 1,3,5-triazine and a multi-functional hindered phenolic compound, a process for the application thereof and the coated fibers resulting therefrom.

14 Claims, No Drawings

STABILIZATION SYSTEMS FOR FIBER FINISHES

A fiber lubricant which is used as a fiber finish has several functions. It must protect the newly spun fiber from fusion or breakage by controlling the yarn to metal friction between the yarn and machine guides, rollers, draw plates, heater plate and texturing false twist spindles or friction disks. The lubricant provides for yarn cohesion giving strength to the yarn by holding the yarn bundle together and by allowing the yarn to build up an acceptable package at the end of processing. Static electricity that is formed as the yarn rapidly moves through the processing equipment would also be controlled. The finish must protect machine surfaces from wear. Since the fiber is exposed to heat treatment during processing steps such as bulking and texturing, the fiber lubricant must also show acceptable thermal stability in air.

The various lubricant properties should not be lost upon exposure of the yarn to temperatures at least above 200° C. by either or both the oxidative degradation of the lubricant or the volatilization of the lubricant. Conventional lubricants for synthetic thermoplastic textile fibers generally suffer from the defect that at temperatures such as at least above 180° C. the lubricants fume indicating volatilization and/or form a tar-like, resinous material. A heated metal plate which is in contact with the yarn during a part of the processing to impart better heat transfer is usually the site at which such resinous materials are deposited.

The need for oxidation resistance in a fiber lubricant is often indicated upon storage of lubricant treated fibers over prolonged periods of time. It is under such conditions that a yarn lubricant stabilized with an oxidation stabilizer, such as 4,4'-thiobis(6-tert.butyl-3-methylphenol), will discolor usually with the formation of a characteristic color.

Various types of thermal stabilizers have been recommended for use in fiber-finishes in an effort to avoid the difficulties noted hereinabove. For example, certain phenols, aryl sulfonamides and phenothiazines have been suggested, although it has been determined that these systems cause discoloration of the finish. 4,4'-Thiobis(6-tert.butyl-3-methylphenol) (SANTONOX R from Monsanto) has been widely utilized as a thermal stabilizer for industrial fiber finishes, although it too exhibits poor resistance to gas fade induced discoloration and thus has been limited to applications where color is not a factor. In addition, U.S. Pat. No. 3,146,272 discloses alkylene oxide condensation products as antioxidants for polyoxyalkylene compounds which may be used as fiber finishes. U.S. Pat. No. 3,397,081 discloses a textile lubricating composition which contains the reaction product of diphenylamine and acetone as an antioxidant for the primary coconut oil—esterified sorbitol/ethylene oxide condensate lubricant. Other antioxidant systems are generally listed as being unsuitable for these specific lubricants such as quinolines, amines and hindered phenols. U.S. Pat. No. 3,505,220 discloses phenolic antioxidants for use in mineral oil/polybutene based finishing compositions. U.S. Pat. No. 4,110,227 discloses oxidation stable polyoxyalkylene fiber lubricants which are based upon the inclusion of the residue of a difunctional phenolic compound in the polyoxyalkylene polymer chain. U.S. Pat. No. 4,127,490 discloses various types of lubricant compositions stabilized by the addition of the reaction product of dicyclopentadiene with a phenolic compound. Finally, U.S. Pat. No. 4,217,228 discloses fiber finishes formulated with aryloxy substituted silicone oil thermal stabilizers.

It is, accordingly, the primary object of this invention to provide thermal and oxidative stabilization systems for various fiber finish compositions.

It is a further object to provide a combined system which improves upon the stabilization performance of the individual components thereof.

Various other objects and advantages of this invention will become apparent from the following detailed description thereof.

It has now been determined that by utilizing a combination of 2,4-bis(n-octylthio)-6-(4-hydroxy-3,5-di-tert.butylanilino)-1,3,5-triazine together with a multifunctional hindered phenol, as defined hereinafter, in the proportions noted as oxidative and thermal stabilization systems for fiber finish compositions based on polyoxyalkylene glycols or fatty acid esters, significantly improved stabilization is achieved. Thus, this blend provides excellent stabilization against both oxidative and thermal degradation. Of primary importance, the combination provides significantly improved performance in the area where the individual compounds are lacking, namely, in reducing the volatility of the fiber finish composition. In fact, a synergistic effect is noted in that the performance of the combination exceeds the sum of the performances of the individual compounds at comparable concentrations. In addition, these systems substantially reduce fuming, color formation and viscosity changes induced by elevated temperature processing. The absence of substantial color formation is also of special significance inasmuch as gas fade induced discoloration is exhibited by many prior art fiber finish stabilization systems, including SANTONOX R. This property greatly expands the areas of use for the fiber finishes stabilized with the instant systems. The reduction in fiber finish volatilization and fuming also ensures the required presence thereof on the fibers during processing. It is also to be noted that the instant systems are readily soluble in the fiber finishes, thereby facilitating processing and stabilization effectiveness. Thus, total stabilizing activity is provided by the systems of this invention.

2,4-bis(n-octylthio)-6-(4-hydroxy-3,5-di-tert.butylanilino)-1,3,5-triazine is commercially available under the trademark IRGANOX 565 from CIBA-GEIGY Corporation. The compound, methods for its preparation and its antioxidant activity in a variety of substrates are fully disclosed in U.S. Pat. Nos. 3,255,191 and 3,334,046. The subject matter of these patents is deemed to be fully incorporated by reference herein.

The multi-functional hindered phenol corresponds to the formulae

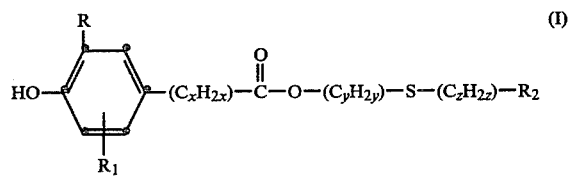

wherein R and $R_1$ independently are $C_1$-$C_6$ alkyl, x is 0 to 6, y and z independently are 2 to 20 and $R_2$ is hydrogen, hydroxy or

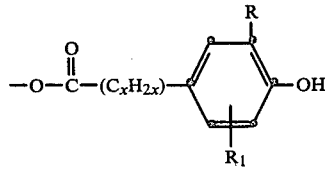

Preferred compounds of formula I exhibit R and $R_1$ as tert.butyl in the ortho positions to the hydroxy group, x, y and z as 2 and $R_2$ as

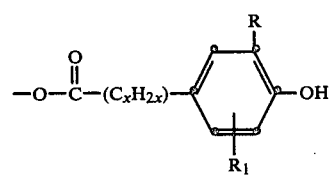

A particularly preferred compound is thio-bis[ethylene 3-(3,5-di-t.butyl-4-hydroxyphenyl)propionate] which is commercially available under the trademark IRGANOX 1035 from CIBA-GEIGY Corporation.

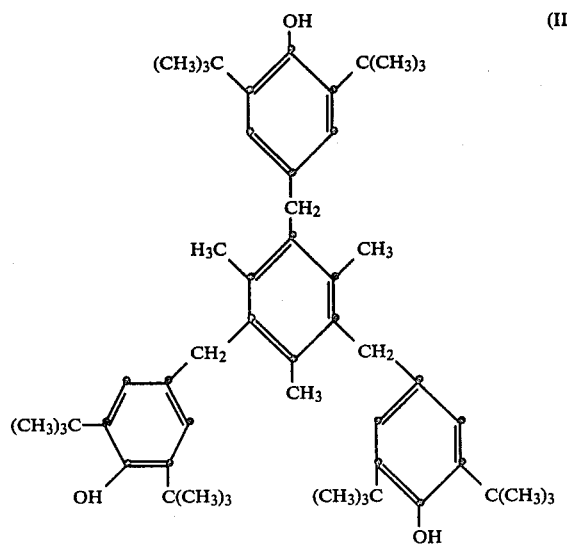

(II)

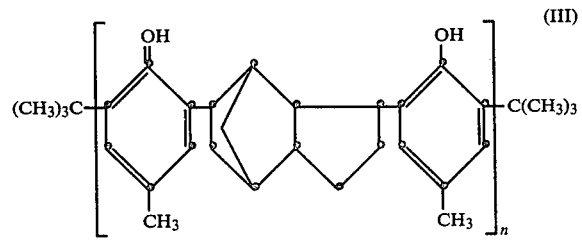

(III)

wherein n is the number of repeating units.

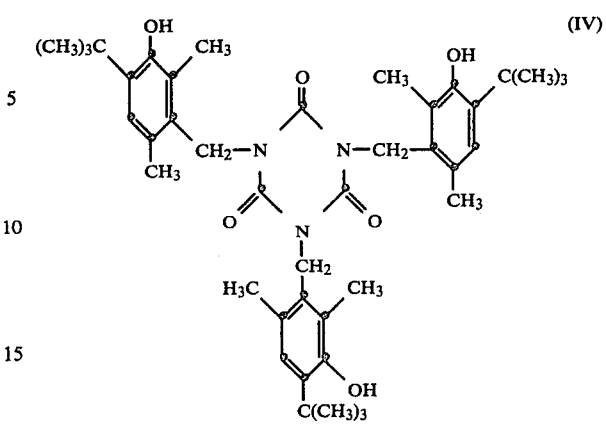

(IV)

The hindered phenol compounds I, methods for their preparation and their antioxidant activity in a variety of substrates are fully disclosed in U.S. Pat. Nos. 3,285,855 and 3,441,575. The subject matter of these patents is deemed to be fully incorporated by reference herein.

The compound of formula II is ETHANOX 330 available from Ethyl Corporation; the compound of formula III is WINGSTAY L (a reaction product of p-cresol and dicyclopentadiene) available from Goodyear Tire & Rubber Co. and the compound of formula IV is CYANOX 1790 available from American Cyanamid Co.

The lubricant may be selected from the group consisting of polyoxyalkylene ether polyols, alkoxylates of fatty acids, and alkoxylates of fatty acids blended with unsaturated vegetable oils. For example, the polyoxyalkylene ether polyols are polyoxyalkylene glycols derived from propylene oxides or ethylene oxides or copolymers thereof.

Specifically, the lubricants utilized in accordance with the present invention include any of the known alkoxylated lubricants such as polyethylene glycols, mixed polyethylenepropylene glycols, monoalkyl esters of mixed polyethylene-polypropylene glycols, alkoxylated esters of fatty acids, rosin acids and tall oil acids, alkoxylated castor oils, alkoxylated hydrogenated castor oils, etc. More specifically, the preferred ethoxylated lubricants include ethoxylated aliphatic alcohols, ethoxylated alkylphenols, ethoxylated sorbitan (anhydrosorbitol) esters, ethoxylated sorbitol esters, ethoxylated glycerol esters, ethoxylated pentaerythritol esters, ethoxylated fatty acids, ethoxylated fatty acid amides, ethoxylated propoxylated fatty acid esters, ethoxylated-propoxylated castor oils, ethoxylated-propoxylated hydrogenated castor oils, ethoxylated-propoxylated aliphatic alcohols, ethoxylated-propoxylated alkyl phenols, etc. Reference may be made to Kirk-Othmer, *Encyclopedia of Chemical Technology,* 2nd Edition, for a more complete description of alkoxylated lubricants.

Representative classes of lubricants may be described by the formulae

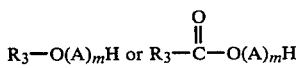

wherein $R_3$ is a straight chain alkyl group having from 8 to 20 carbon atoms, A is a mixture of oxypropylene and oxyethylene groups. The oxypropylene to oxyethylene ratio of said total weight being from 0.1 to 1 to 1.0 to 0.1, and m is an integer such that the oxyalkylene groups constitute 50 to 90% by weight of the compound. These compounds are prepared either by random addition of oxyalkylene groups or sequential addition thereof. A number of these compounds are more particularly defined in U.S. Pat. Nos. 3,340,309 and 3,504,041 which disclosures are incorporated herein by reference.

Other applicable polyoxyalkylene glycols are described in U.S. Pat. Nos. 2,674,619 and 3,101,374.

The alkoxylates of fatty acids may correspond to the general formula

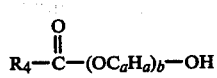

wherein $R_4$ reflects the residue of the fatty acid. Typical materials include polyoxyethylene laurate, myristate, palmitate, stearate, behenate and the like.

Correspondingly, the alkoxylates of fatty acids may be blended with up to about 90%, by weight, of an unsaturated vegetable oil including corn, safflower, soybean, sunflower, linseed, cottonseed, palm and peanut oils, and the like.

Typical fiber finishes of the polyoxyalkylene ether polyols are available under the designation UCC 50 HB-260 from Union Carbide and under the designation PLURONIC L-35 from BASF Wyandotte Corp. A finish comprising a blend of fatty acid ester and unsaturated vegetable oil is available from DuPont.

In order to exhibit the properties noted herein, the triazine and hindered phenol are utilized in weight ratios ranging from 1:1 to 1:9 and preferably from 1:5 to 1:7. The combined system is added to the fiber finish in concentrations ranging from about 0.1 to 5.0%, by weight, and preferably in a concentration range of from about 0.5 to 3.0%.

The stabilized fiber finish can be prepared by blending the components together. Moderate heating may be utilized in order to obtain a uniform solution. Optional ingredients may also be incorporated, such optional materials including antistatic agents, bactericides, friction modifiers, emulsifiers, buffering agents, and the like. The stabilized finishes may be applied to a wide variety of natural and synthetic fibers including wool, cotton, polyester, polyamide, polyolefin, acrylic, and the like.

Utilization of the stabilized fiber lubricants can be in any conventional spin-drawing process or in a separate drawing process available in the prior art. The treatment of the synthetic fibers with the fiber lubricants can be effected by any method practiced in the prior art to provide lubrication such as immersion, roll application, wicking, spraying, and the like. The treating agent of the invention is applied to the fibers either directly or preferably as an aqueous emulsion having a concentration of 1 to 30% by weight. Sufficient lubricity is obtained with a dry weight add-on of the treating lubricant of usually about 0.05% to about 3.0%, preferably about 0.2% to about 1.0%, by weight based upon the weight of the fibers. The temperature at which the fibers are heat-treated usually ranges from 150° C. to 320° C., preferably above 200° C. The stabilized fiber lubricants of the invention provide especially satisfactory lubrication and resistance to oxidation over the temperature range of 200° C. to 230° C.

The following examples illustrate the preferred embodiments of this invention. In these examples, all parts given are by weight unless otherwise noted.

EXAMPLE I

This example illustrates the stabilization effectiveness of blends of the instant invention.

The blends of 2,4-bis(n-octylthio)-6-(4-hydroxy-3,5-di-tert.butylanilino)-1,3,5-triazine and thio-bis[ethylene-3-(3,5-di-tert.butyl-4-hydroxyphenyl)propionate] as noted in the following tables were added in the indicated weight concentrations to a fiber finish consisting of a blend of a pentaerythritol tetra ester and unsaturated vegetable oil (from DuPont).

In order to evaluate the performance characteristics of the resulting solutions, the following test methods were utilized. Fiber finish weight retention was evaluated by placing 0.2 grams of the stabilized finish into a tared dish, placing the dish into a prewarmed hot air oven at the indicated temperature and weighing the samples (after cooling in a dessicator) at periodic intervals.

Gas fade induced discoloration was determined by adding five drops of the stabilized fiber solution to a white cotton cloth. The cloth was then placed in a gas chamber and held at 60° C. for the indicated period of time. The Yellowness Index of the exposed cloth was thereafter determined according to ASTM D 1925-63T.

The results of these tests are noted in the following table.

| Additive | Conc. (% by weight) of finish | Weight Retention-Aging at 230° C. (%) | | | |
|---|---|---|---|---|---|
| | | 1 Hr. | 2 Hr. | 3 Hr. | 4 Hr. |
| — | — | 41.5 | 34.7 | 31.8 | 29.4 |
| IRGANOX 565 | 1 | 76.7 | 63.1 | 54.0 | 44.0 |
| | 2 | 76.6 | 60.0 | 48.6 | 40.2 |
| | 3 | 89.4 | 77.2 | 67.3 | 60.9 |
| IRGANOX 1035 | 1 | 44.6 | 33.5 | 29.6 | 26.5 |
| | 2 | 57.4 | 39.6 | 32.6 | 28.6 |
| | 3 | 79.9 | 69.6 | 44.8 | 36.4 |
| 1:1 1035/565 | 1 | 55.6 | 45.2 | 38.4 | 33.3 |
| | 2 | 84.5 | 68.9 | 56.8 | 47.6 |
| | 3 | 77.7 | 57.9 | 46.4 | 38.5 |
| 3:1 1035/565 | 1 | 52.5 | 43.9 | 38.8 | 35.7 |
| | 2 | 83.2 | 70.8 | 56.8 | 44.4 |
| | 3 | 73.4 | 53.0 | 43.6 | 38.6 |
| 5:1 1035/565 | 1 | 57.9 | 46.6 | 40.8 | 37.4 |
| | 2 | 85.5 | 69.7 | 54.4 | 41.8 |
| | 3 | 82.2 | 62.0 | 53.3 | 47.1 |
| 7:1 1035/565 | 1 | 57.5 | 47.2 | 42.6 | 38.4 |
| | 2 | 81.7 | 60.3 | 43.8 | 35.8 |
| | 3 | 75.6 | 52.4 | 45.3 | 38.7 |

| Additive | Yellowness Index (50 Hrs. at 60° C.) |
|---|---|
| — | 5.5 |
| IRGANOX 565 | 6.0 |
| IRGANOX 1035 | 20.5 |
| 1:1 1035/565 | 17.5 |
| 3:1 1035/565 | 27.0 |
| 5:1 1035/565 | 27.5 |
| 7:1 1035/565 | 28.3 |
| SANTONOX R | 51.8 |

It is seen that the instant combination of this invention provides significantly improved stabilization effectiveness in such fiber finishes in terms of weight retention and is superior in color to a commercial fiber finish stabilizer.

EXAMPLE II

The procedures of Example I were repeated with the exception that a low molecular weight ethylene oxide, propylene oxide copolymer (50 HB-260 from Union Carbide) was utilized as the fiber finish and the stabilizer system was added in a 2% weight concentration.

| Additive | Weight Retention-Aging at 190° C. (%) | | | |
|---|---|---|---|---|
| | 1 Hr. | 3 Hrs. | 4 Hrs. | 5 Hrs. |
| — | 0.5 | — | — | — |
| IRGANOX 565 | 72.5 | 2.8 | 2.4 | 2.3 |
| IRGANOX 1035 | 1.3 | 0.7 | 0.5 | 0.6 |
| 1:1 1035/565 | 95.8 | 91.5 | 90.1 | 87.7 |
| 3:1 1035/565 | 95.7 | 92.4 | 90.2 | 79.1 |
| 5:1 1035/565 | 95.4 | 91.5 | 88.3 | 71.9 |

| Additive | Yellowness Index (50 Hrs. at 60° C.) |
|---|---|
| 1:1 1035/565 | 27.8 |
| 3:1 1035/565 | 32.8 |
| 5:1 1035/565 | 38.5 |
| 7:1 1035/565 | 41.6 |
| SANTONOX R | 54.1 |

EXAMPLE III

The procedures of Example I were repeated with the exception that an ethylene oxide, propylene oxide copolymer (PLURONIC L-35 from BASF Wyandotte Corp.) was utilized as the fiber finish and the stabilizer system was added in a 2% weight concentration.

| Additive | Weight Retention-Aging at 190° C. (%) | | | |
|---|---|---|---|---|
| | 1 Hr. | 2 Hrs. | 3 Hrs. | 3.5 Hrs. |
| — | <1 | <1 | <1 | <1 |
| IRGANOX 565 | 99.7 | 99.3 | 92.2 | 78.5 |
| IRGANOX 1035 | 99.6 | 97.5 | 75.7 | 42.5 |
| 1:1 1035/565 | 99.7 | 99.7 | 92.3 | 82.8 |
| 3:1 1035/565 | 99.6 | 98.9 | 95.4 | 89.3 |
| 5:1 1035/565 | 99.7 | 98.8 | 93.6 | 84.4 |
| 7:1 1035/565 | 99.7 | 98.9 | 90.9 | — |

EXAMPLE IV

The procedures of Example I were repeated utilizing a variety of stabilizer systems in the fiber finish of Example I at 2% weight concentrations.

| Additive | Weight Retention-Aging 1 Hr. at 230° C. (%) |
|---|---|
| — | 39.8 |
| IRGANOX 565 | 87.2 |
| IRGANOX 1035 | 71.4 |
| 5:1 1035/565 | 81.0 |
| ETHANOX 330 | 41.7 |
| 5:1 330/565 | 56.0 |
| WINGSTAY L | 69.0 |
| 5:1 L/565 | 72.6 |
| CYANOX 1790 | 60.1 |
| 5:1 1790/565 | 75.4 |

These data illustrate the effectiveness of the instant combinations utilizing differing multi-functional hindered phenolic compounds.

In summary, this invention provides a synergistic system for stabilizing various fiber finishes against oxidative and thermal degradation. Variations may be made in various elements thereof without departing from the scope of the invention as defined by the following claims.

What is claimed is:

1. A fiber treating composition comprising
   (A) a lubricant selected from the group consisting of polyoxyalkylene ether polyols, alkoxylates of fatty acids, and alkoxylates of fatty acids blended with unsaturated vegetable oils; and
   (B) an effective stabilizing amount of a mixture of 2,4-bis(n-octylthio)-6-(4-hydroxy-3,5-di-tert-.butylanilino)-1,3,5-triazine and a multi-functional hindered phenol corresponding to the formulae:

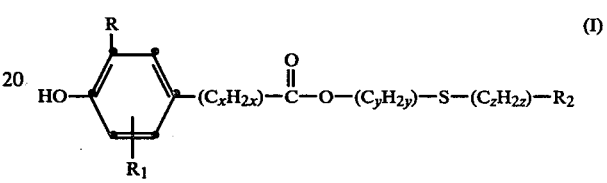

wherein R and $R_1$ independently are $C_1$–$C_6$ alkyl, x is 0 to 6, y and z independently are 2 to 20 and $R_2$ is hydrogen hydroxy or

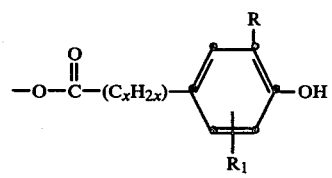

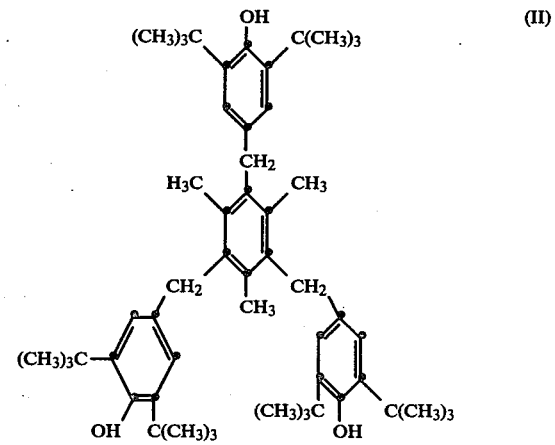

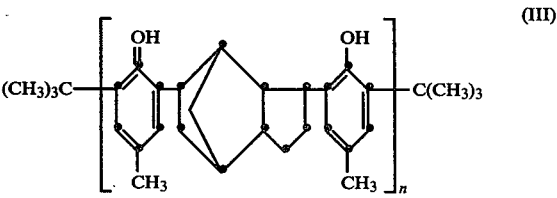

wherein n is the number of repeating units

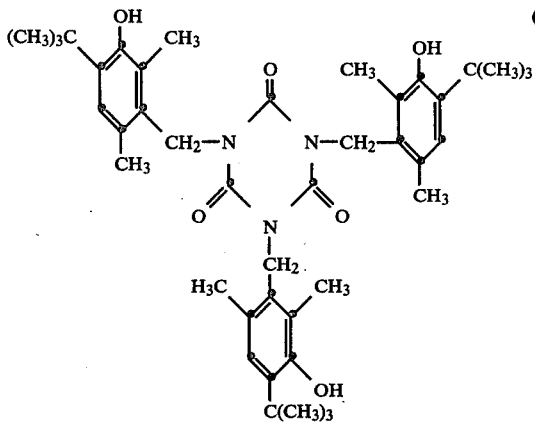

said triazine and said phenol being present in said mixture in a weight ratio of from 1:1 to 1:9.

2. The composition of claim 1, wherein said hindered phenol corresponds to formula I.

3. The composition of claim 1, wherein said hindered phenol corresponds to formula II.

4. The composition of claim 1, wherein said hindered phenol corresponds to formula III.

5. The composition of claim 1, wherein said hindered phenol corresponds to formula IV.

6. The composition of claim 2, wherein said phenol is thio-bis[ethylene-3-(3,5-di-tert.butyl-4-hydroxyphenyl)-propionate].

7. The composition of claim 1, wherein said lubricant is a polyoxyalkylene glycol derived from propylene oxide or ethylene oxide or copolymers thereof.

8. The composition of claim 1, wherein said lubricant in an alkoxylate of a $C_{12}$–$C_{22}$ fatty acid.

9. The composition of claim 8, wherein said alkoxylate is blended with an unsaturated vegetable oil.

10. The composition of claims 1 or 6, wherein said weight ratio is 1:5 to 1:7.

11. The composition of claim 1, wherein said mixture (B) is added to lubricant (A) in a concentration of from about 0.1 to 5.0%, by weight.

12. The composition of claim 11, wherein said concentration is 2%, by weight.

13. Natural or synthetic fibers having deposited thereon the composition of claims 1 or 6.

14. A process for lubricating and protecting natural or synthetic fibers comprising applying to said fibers an effective amount of the composition of claims 1 or 6.

* * * * *